(12) United States Patent
Onizawa

(10) Patent No.: US 6,388,008 B2
(45) Date of Patent: May 14, 2002

(54) CROSSLINKING ISOPRENE-ISOBUTYLENE RUBBER WITH ALKYLPHENOL-FORMALDEHYDE RESIN, HYDRAZIDE AND EPOXY COMPOUND

(76) Inventor: Masao Onizawa, 2-111-3, Owada-cho, Omiya-shi, Saitama-ken (JP)

( * ) Notice: Subject to any disclaimer, the term of this patent is extended or adjusted under 35 U.S.C. 154(b) by 0 days.

(21) Appl. No.: 09/794,634

(22) Filed: Feb. 28, 2001

Related U.S. Application Data

(62) Division of application No. 09/391,529, filed on Sep. 8, 1999, now Pat. No. 6,255,394.

(30) Foreign Application Priority Data

Sep. 8, 1998 (JP) .......................... 10-269057
Aug. 3, 1999 (JP) .......................... 11-220017

(51) Int. Cl.⁷ .............................. C08K 3/22; C08L 9/00
(52) U.S. Cl. ..................... 525/109; 523/467; 525/138
(58) Field of Search ................. 525/109, 138; 523/467

(56) References Cited

U.S. PATENT DOCUMENTS

| | | | | |
|---|---|---|---|---|
| 5,705,549 A | * | 1/1998 | Hojo | 524/211 |
| 5,990,204 A | * | 11/1999 | Onizawa | 523/457 |

FOREIGN PATENT DOCUMENTS

| | | | |
|---|---|---|---|
| GB | 2248625 A | * | 4/1992 |
| JP | 2-284910 A2 | * | 11/1990 |
| JP | 4-348180 A | * | 3/1992 |
| JP | 6-172590 A2 | * | 6/1994 |
| JP | 7-307254 A2 | * | 11/1995 |
| JP | 9-12839 A2 | * | 1/1997 |
| JP | 10-17722 A2 | * | 1/1998 |

OTHER PUBLICATIONS

Chemical abstracts accession No. 1968:50775, Kurachenkova et al., Kauch. Rezina (1967), vol. 26, No. 7, pp. 26–28.*
Chemical abstracts accession No. 1974:537342, Emel'yanenko et al., Vses. Nauch.–Tekh. Knof. (1973), No. 1, pp. 112–113.*
Chemical abstracts accession No. 1977:486176, Kharitonov et al., Deposited Doc. (1975), VINITI 3015–75, 8 pages.*
Chemical abstracts accession No. 1984:8174, Dukacek et al., Plasty Kauc. (1983), vol. 20, No. 7, pp. 196–199.*
Polysar Butyl Handbook, issued by Polysar Co., 1996, pp. 117.

* cited by examiner

Primary Examiner—Robert E. L. Sellers

(57) ABSTRACT

The present invention provides a method for crosslinking an isoprene-isobutylene rubber, which comprises adding, to 100 parts by weight of an isoprene-isobutylene rubber, 5 to 25 parts by weight of an alkylphenol-formaldehyde resin and 0.1 to 5 parts by weight of a hydrazide compound, or 5 to 25 parts by weight of an alkylphenol-formaldehyde resin, 0.1 to 5 parts by weight of a hydrazide compound and 0.3 to 10 parts by weight of an epoxy compound. According to this method, a crosslinked rubber product of high hardness can be obtained without using any halogen compound or increasing the amount of carbon black used.

7 Claims, 7 Drawing Sheets

CROSSLINKING ISOPRENE-ISOBUTYLENE RUBBER WITH ALKYLPHENOL-FORMALDEHYDE RESIN, HYDRAZIDE AND EPOXY COMPOUND

CROSS-REFERENCE TO RELATED APPLICATIONS

This application is a divisional of application Ser. No. 09/391,529, filed Sep. 8, 1999, now U.S. Pat. No. 6,255,394, which claims priority to Japanese Application No. 269,057/98, filed Sep. 8, 1998 and Japanese Application No. 220,017/99, filed Aug. 3, 1999.

BACKGROUND OF THE INVENTION (1) Field of the Invention

The present invention relates to a novel method for crosslinking an isoprene-isobutylene rubber which is a synthetic rubber, as well as to a crosslinked rubber product obtained by the method.

(2) Description of the Prior Art

Isoprene-isobutylene rubber (hereinafter abbreviated to "butyl rubber" in some cases) is produced by copolymerization of isoprene and isobutylene, has an unsaturation degree of 0.5 to 3 mole %, and is a known synthetic rubber. Crosslinked butyl rubber has low gas permeability, electrical insulation, heat resistance, damping property, resistance to acids and alkalis, low water absorption, etc., and is in use in rubber vibration insulator, automotive tube, packing, rubber stopper, o-ring, etc.

For crosslinking of butyl rubber, there have been known three methods, i.e. sulfur crosslinking, quinoid crosslinking and resin crosslinking. Of these, resin crosslinking is most preferred in order to obtain a crosslinked butyl rubber which satisfies the requirements for heat resistance, low compression set, high hardness, high electrical insulation, low corrosivity to metals, etc.

Regarding the technique for crosslinking of butyl rubber, there is the following description in p. 117 of "POLYSAR Butyl Handbook" issued by Polysar Co. in 1996.

"POLYSAR Butyl compounds with exceptional heat resistance and low compression set can be obtained by curing with dimethylol phenol resins. Halogen-bearing activators are customarily used in conjunction with the resin, but it is possible to produce satisfactory cures without activation by curing at high temperature, especially with high unsaturation POLYSAR Butyl rubbers."

Thus, a butyl rubber becomes a crosslinked butyl rubber of good properties by adding only a dimethylphenol resin thereto and conducting crosslinking at 180 to 210° C. The crosslinked butyl rubber has good properties in heat resistance, low compression set, electrical insulation and corrosivity to metals. However, when there is required a crosslinked butyl rubber having good electrical insulation and yet a high hardness, it is difficult to find an appropriate combination of raw materials enabling the production of such a crosslinked butyl rubber. That is, carbon black, which is used as a filler to impart a certain hardness to a crosslinked butyl rubber obtained, has an upper limit in the addition amount when the crosslinked butyl rubber must have electrical insulation; in such a case, therefore, use of carbon black alone is unable to allow the obtained crosslinked butyl rubber to have a desired hardness. Examples of the crosslinked butyl rubber product having a high hardness are a hard butyl rubber roller, a packing for high-pressure-water pipe and a sealing rubber for electrolytic capacitor.

In producing such a product, a silane coupling agent has been used, in addition to carbon black, to obtain a required hardness. The silane coupling agent includes silanes such as vinylsilane, mercaptosilane, aminosilane and the like. When a silane is added, the silanol group of the silane reacts with silica or clay (which is added as other filler), whereby a high strength and a high hardness are obtained; however, the hardness obtained is unstable.

For example, the hardness obtained differs depending upon whether a silane is added in a mixture with silica or clay or a silane is added separately. Further, when a closed type kneader (e.g. a Banbury mixer) is used and when a silane is added to a compound (a raw material mixture) of 150° C. or higher, no stable hardness is obtained because the silane is vaporized or its reaction with silica or clay is unstable (thus, there are indefinite parameters). The reason therefor is thought to be that the reaction of the silane with silica or clay is difficult to control.

Production of a crosslinked butyl rubber of high hardness by resin crosslinking is possible by using a halogen compound (e.g. tin chloride or chloroprene rubber) in combination with a phenolic resin, when there is no upper limit to the amount of carbon black used. Use of a halogen compound, however, is not preferred depending upon the application of the crosslinked butyl rubber obtained, because the halogen compound may cause metal corrosion. Further, increase in carbon black amount for production of crosslinked butyl rubber of high hardness is not preferred, either, because the compound (raw material mixture) used for production of such a crosslinked butyl rubber has low moldability or because the crosslinked butyl rubber obtained has low electrical insulation.

Herein, "butyl rubber of high hardness" refers to a butyl rubber having a JIS-A hardness or durometer-A hardness of 80 or more.

SUMMARY OF THE INVENTION

The present invention aims at alleviating the above-mentioned problems of the prior art by providing (a) a novel method for crosslinking a butyl rubber with a resin without using any halogen compound and (b) a crosslinked rubber product of high hardness obtained by the method (a).

The first object of the present invention is to provide a novel method for crosslinking a butyl rubber with an alkylphenol-formaldehyde resin without using any halogen compound. The second object of the present invention is to provide a crosslinked rubber product of high hardness obtained by the above crosslinking method.

The third object of the present invention is to provide a novel method for crosslinking a butyl rubber with an alkylphenol-formaldehyde resin, wherein a hydrazide compound or a hydrazide compound and an epoxy compound are used in combination with the alkylphenol-formaldehyde resin and no halogen compound is used. The fourth object of the present invention is to provide a crosslinked rubber product which has good moldability, causes no metal corrosion, and is excellent in electrical insulation and high in hardness.

Other objects of the present invention will become apparent from the following description.

The above objects of the present invention are achieved by:

(1) a method for crosslinking an isoprene-isobutylene rubber, which comprises adding, to an isoprene-isobutylene rubber, an alkylphenol-formaldehyde resin and a hydrazide compound;

(2) a method for crosslinking an isoprene-isobutylene rubber, which comprises adding, to an isoprene-isobutylene rubber, an alkylphenol-formaldehyde resin, a hydrazide compound and an epoxy compound; and (3) a crosslinked rubber product obtained by the above method (1) or (2).

In the above method (1) and/or (2), the amount of the isoprene-isobutylene rubber is 100 parts by weight; the amount of the alkylphenol-formaldehyde resin is 5 to 25 parts by weight; the amount of the hydrazide compound is 0.1 to 5 parts by weight; and the amount of the epoxy compound is 0.3 to 10 parts by weight.

The alkylphenol-formaldehyde resin is a compound represented by the following formula (1):

(1)
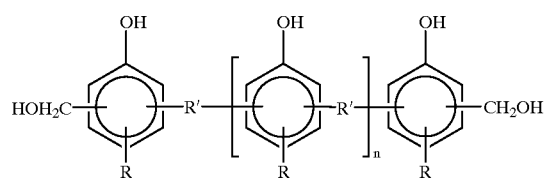

wherein n is 0 to 10, R is an aliphatic alkyl group having 1 to 10 carbon atoms, and R' is —CH₂— or —CH₂OCH₂—.

The hydrazide compound is at least one kind of hydrazide compound selected from the group consisting of the dibasic acid dihydrazides and carbodihydrazide represented by the following formulas (2) to (5):

(2)
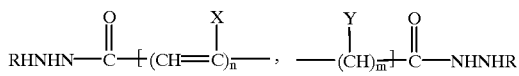

[wherein X and Y may be the same or different and are each a hydrogen atom or an alkyl group having 1 to 5 carbon atoms; R is a hydrogen atom or a group represented by

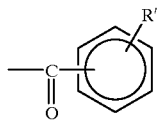

(wherein R' is a hydrogen atom, a methyl group or a hydroxyl group); n is a number of 0 to 2; and m is a number of 0 to 20 (n and m are not 0 simultaneously)], (3)
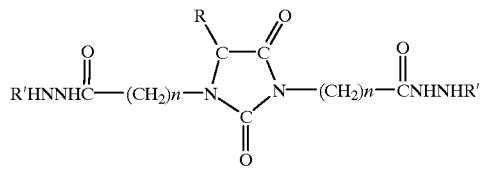

[wherein R is a hydrogen atom or an alkyl group having 1 to 10 carbon atoms; R' is a hydrogen atom or a group represented by

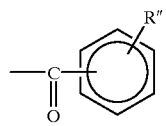

(wherein R" is a hydrogen atom, a methyl group or a hydroxyl group); and n is a number of 1 to 10], (4)

[wherein R is a hydrogen atom or a group represented by

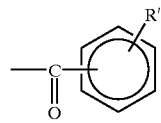

(wherein R' is a hydrogen atom, a methyl group or a hydroxyl group)], and (5)
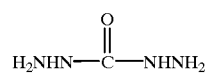

Specific examples of the hydrazide compound are carbodihydrazide, adipic acid dihydrazide, sebacic acid hydrazide, dodecanedioic acid dihydrazide, isophthalic acid hydrazide, maleic acid hydrazide, decamethylenedicarboxylic acid disalicyloylhydrazide, eicosanedioic acid dihydrazide, 7,11-octadecadiene-1,18- dicarbohydrazide, and 1,3-bis(hydrazinocarboethyl)-5-isopropylhydantoin.

The epoxy compound is at least one kind of epoxy compound selected from the group consisting of a bisphenol A type epoxy resin, a bisphenol F type epoxy resin, a bisphenol AD type epoxy resin, a bisphenol type epoxy resin obtained by substituting one methyl group added to the skeleton of bisphenol AD type epoxy resin, with an alkyl group having 2 to 12 carbon atoms, a phenolic novolac type epoxy resin, a cresol novolac type epoxy resin, a triphenylmethane type polyfunctional epoxy resin, an alicyclic epoxy compound, a naphthol-modified novolac type epoxy resin and an epoxy compound of glycidyl o-, m- or p-phthalate or o-, m- or p-hydrophthalate type.

DETAILED DESCRIPTION OF THE INVENTION

Figure 1:
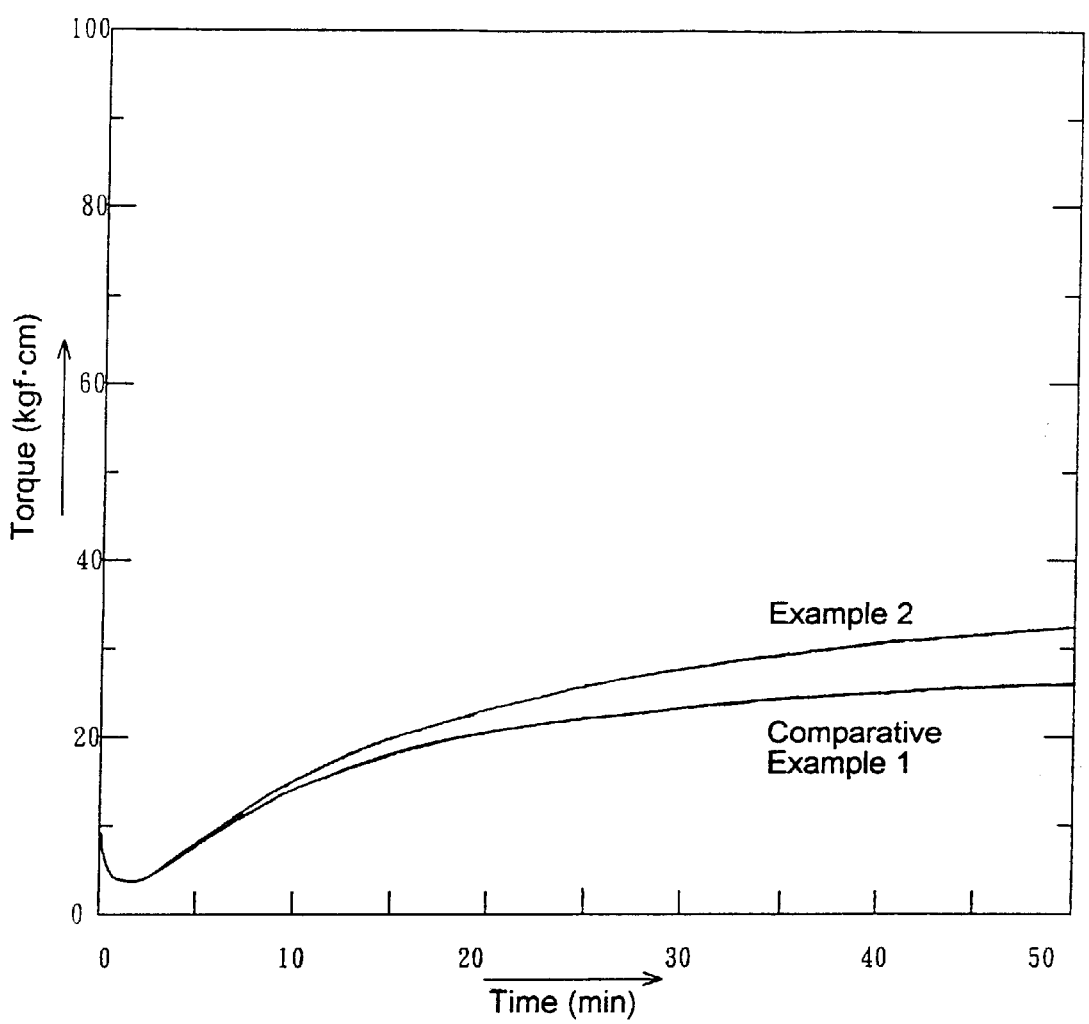
FIG. 1 shows the crosslinking curves of Example 2 and Comparative Example 1 obtained by the torque measurement made at 190° C. by the use of an oscillating rheometer.

The present invention is described in detail below.

The isoprene-isobutylene rubber (butyl rubber) used in the present invention is produced by copolymerization of isoprene and isobuytlene, has an unsaturation degree of generally 0.5 to 3.0 mole %, and is a known synthetic rubber.

The scope of the present invention does not include any halogenated butyl rubber obtained by adding bromine or chlorine to an isoprene-isobutylene rubber.

The alkylphenol-formaldehyde resin used in the present invention can be any alkylphenol-formaldehyde resin which can be effectively used in the resin crosslinking of butyl rubber according to the present invention, and has no particular restriction. However, a compound of relatively low molecular weight having methylol group is used preferably. There can be preferably used, for example, a mixture of low-molecular compounds each represented by the following formula (1):

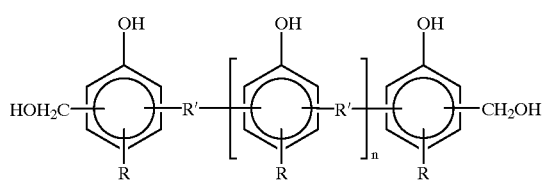

(1)

wherein n is 0 (zero) to 10, R is an aliphatic alkyl group having 1 to 10 carbon atoms, and R' is —CH$_2$— or —CH$_2$OCH$_2$—. Such compounds are commercially available as, for example, TACKIROL 201 (trade name, a product of Taoka Chemical Co., Ltd.) and HITANOL 2501 (trade name, a product of Hitachi Chemical Co., Ltd). The amount of the alkylphenol-formaldehyde resin added is 5 to 25 parts by weight, preferably 10 to 20 parts by weight per 100 parts by weight of butyl rubber. When the amount is less than 5 parts by weight, no intended effect is obtained. When the amount is more than 25 parts by weight, the sticking of raw material rubber is striking, resulting in reduced operability. Therefore, such amounts are not desirable.

Use of a halogenated alkylphenol-formaldehyde resin wherein the methylol group is substituted with bromine, or use of a halogenated alkylphenol-formaldehyde resin wherein the benzene ring has a halogen subsituent(s), is unsuitable for the objects of the present invention and is not included in the scope of the present invention.

The hydrazide compound used in the present invention can be any hydrazide compound as long as it can be effectively used for the resin crosslinking of butyl rubber of the present invention. However, particularly preferred hydrazides are saturated or unsaturated aliphatic dibasic acid hydrazides; dibasic acid hydrazides having a hydantoin skeleton; phthalic acid hydrazides; hydrazide compounds obtained by a reaction of each one hydrogen atom of the two —NH$_2$ possessed by the above hydrazide compounds, with benzoic acid, o-, m- or p-toluylic acid or o-, m- or p-oxybenzoic acid; carbodihydrazide; and so forth.

As specific examples of the hydrazide compound, there can be mentioned carbodihydrazide, adipic acid dihydrazide, sebacic acid hydrazide, dodecanedioic acid dihydrazide, isophthalic acid hydrazide, maleic acid hydrazide, decamethylenedicarboxylic acid disalicyloylhydrazide, eicosanedioic acid dihydrazide, 7,11-octadecadiene-1,18-dicarbohydrazide, and 1,3-bis (hydrazinocarboethyl)-5-isopropylhydantoin.

The amount of the hydrazide compound used is 0.1 to 5 parts by weight, preferably 0.3 to 4 parts by weight (when hydrazide compounds of two or more kinds are used, the amount is their total amount), per 100 parts by weight of butyl rubber. When the amount of the hydrazide compound used is less than 0.1 part by weight, no intended effect is obtained. When the amount is more than 5 parts by weight, no additional effect is obtained.

By adding, to a butyl rubber, a alkylphenol-formaldehyde resin and a hydrazide compound to give rise to crosslinking, a crosslinked rubber of high hardness can be obtained. By this crosslinking method, the first, second and third objects of the present invention can be achieved. This method of the present invention is most appropriate when the obtained butyl rubber is used as a sealing rubber for capacitor of aluminum electrolysis, because the rubber causes no electrode corrosion.

The hydrazide compound used in the present invention is described in more detail below.

The saturated or unsaturated aliphatic dibasic acid hydrazides used in the present invention are (a) dibasic acid hydrazides derived from saturated or unsaturated aiphatic dicarboxylic acids having up to 2 unsaturated bonds represented by

and up to 20 bonds represented by

and (b) hydrazide compounds obtained by a reaction of each one hydrogen atom of the two —NH$_2$ possessed by the above dibasic acid hydrazides (a), with benzoic acid, o-, m- or p-toluylic acid or o-, m- or p-oxybenzoic acid, both the dibasic acid hydrazides (a) and the hydrazide compounds (b) being represented by the following formula (2):

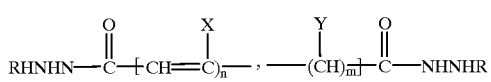

(2)

[wherein X and Y may be the same or different and are each a hydrogen atom or an alkyl group having 1 to 5 carbon atoms; R is a hydrogen atom or a group represented by

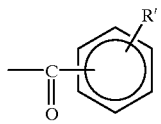

(wherein R' is a hydrogen atom, a methyl group or a hydroxyl group); n is a number of 0 (zero) to 2; and m is a number of 0 (zero) to 20 (n and m are not 0 simultaneously)]. In the formula (2), [ ] indicates that the bond

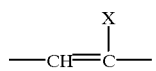

and the bond

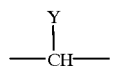

are combined at random.

In the following formulas (6) to (8) are shown the structural formulas of sebacic acid hydrazide (which is a saturated aliphatic dibasic acid hydrazide), 7,11-octadecadiene-1,18-dicarbohydrazide (which is an unsaturated aliphatic dibasic acid hydrazide) and decamethylene-dicarboxylic acid disalicyloylhydrazide (which is a reaction product of a saturated aliphatic dibasic acid hydrazide with o-oxybenzoic acid).

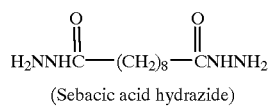
(Sebacic acid hydrazide)

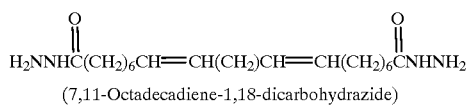
(7,11-Octadecadiene-1,18-dicarbohydrazide)

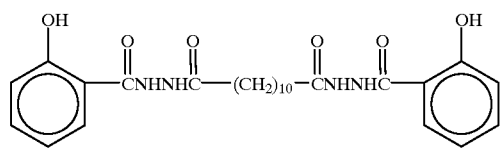

(Decamethylenedicarboxylic Acid Disalicyloylhydrazide)

The dibasic acid hydrazides having a hydantoin skeleton and the hydrazide compounds obtained by a reaction of each one hydrogen atom of the two —$NH_2$ possessed by the above dibasic acid hydrazides, with benzoic acid, o-, m- or p-toluylic acid or o-, m- or p-oxybenzoic acid are represented by the following formula (3):

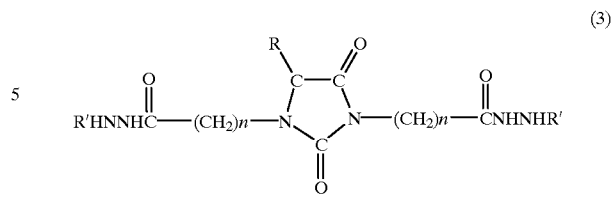

[wherein R is a hydrogen atom or an alkyl group having 1 to 10 carbon atoms; R' is a hydrogen atom or a group represented by

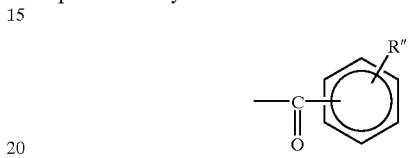

(wherein R" is a hydrogen atom, a methyl group or a hydroxyl group); and n is a number of 1 to 10].

In the following formula (9) is shown the structural formula of 1,3-bis(hydrazinocarboethyl)-5-isopropylhydantoin which is a specific example of the compounds of the formula (3).

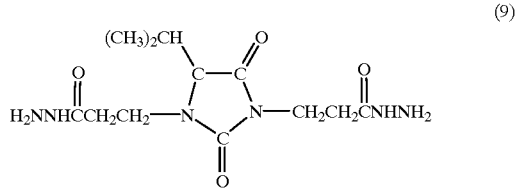

The phthalic acid hydrazides are shown by the following formula (4):

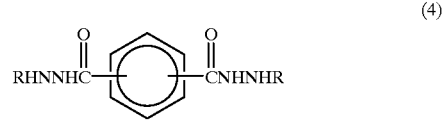

wherein R has the same definition as R' of the formula (3).

In the following formula (10) is shown the structural formula of isophthalic acid hydrazide which is a specific example of the compounds of the formula (4).

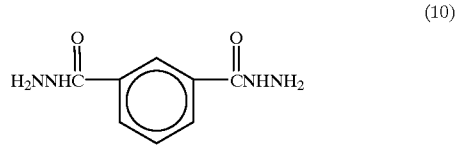
(Isophthalic acid hydrazide)

The carbodihydrazide is represented by the following formula (5).

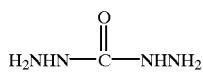

(5)

Of these hydrazide compounds, preferably used are dodecanedioic acid dihydrazide, decamethylenedicarboxylic acid disalicyloylhydrazide, etc. These hydrazide compounds favorably accelerate the crosslinking of butyl rubber with alkylphenol-formaldehyde resin and, moreover, enables production of a hard crosslinked rubber having a JIS-A or durometer-A hardness of 80 or more without any increase in the amount of carbon black added. The finding that these hydrazide compounds show a unique effect in the resin crosslinking of butyl rubber, has led to the completion of the present invention.

In carrying out the crosslinking of butyl rubber using an alkylphenol-formaldehyde resin and a hydrazide compound according to the present invention, there is no particular restriction as to the crosslinking conditions. Ordinarily, however, primary crosslinking is conducted at 170 to 210° C. for 5 to 20 minutes by the use of a hot press used by those skilled in the art. Secondary crosslinking is not always necessary, but it is effective in order to obtain a crosslinked rubber showing a small hardness change during the long use. Secondary crosslinking, when required, can be conducted at 170 to 210° C. for 30 minutes to 3 hours.

To butyl rubber can as necessary be added, in addition to the alkylphenol-formaldehyde resin and the hydrazide compound both used as crosslinking agents, various fillers ordinarily used in rubbers, such as carbon black, talc, kaolin clay (kaolinite), calcium carbonate, softener, zinc oxide, stearic acid and the like.

The fillers usable in the present invention are substances added as base materials in order to improve the properties (e.g. strength and durability) of final product, and substances added for the weight or volume increase or cost reduction of final product. Specific examples of the fillers are carbon blacks such as channel black, furnace black and the like; fine particle silicic acids such as dry method white carbon (silica), wet method white carbon (silica) and the like; silicate, calcium carbonate, kaolinite (clay) or calcinated clay obtained by calcination of kaolinite (clay); hydrous magnesium silicate (talc); zinc oxide; magnesium oxide; and so forth. They can be used as necessary. When there is produced a crosslinked rubber product of high hardness without reducing the electrical insulation, the amount of carbon black added is preferably 60 parts by weight or less per 100 parts by weight of butyl rubber.

Besides, there can also be added substances such as stearic acid, antioxidant, paraffin wax, AC polyethylene and the like.

The present invention further provides a novel method for crosslinking a butyl rubber with an alkylphenol-formaldehyde resin, wherein a hydrazide compound and an epoxy compound are used in combination with the alkylphenol-formaldehyde resin and no halogen compound is used. This method accelerates the crosslinking of butyl rubber with alkylphenol-formaldehyde resin, by using a hydrazide compound and an epoxy compound and, moreover, makes it easier to produce a hard rubber product having a JIS-A or durometer-A hardness of 80 or more while suppressing the amount of carbon black used at a certain level.

The above crosslinking method is suitably used for production of a butyl rubber roller of high hardness, a packing for high-pressure-steam pipe, etc. However, in production of a crosslinked butyl rubber with an alkylphenol-formaldehyde resin, for use as a sealing rubber for capacitor of aluminum electrolysis, it is recommenced not to use any epoxy compound because the chlorine contained in the epoxy compound as an impurity is activated by the alkylphenol-formaldehyde resin added as a crosslinking agent and the chlorine is released over a long period of time during the use of the rubber product. The risk of electrode corrosion by such chlorine is high particularly when the alkylphenol-formaldehyde resin is added in an amount of 14 parts by weight or more. Nevertheless, the above method can give an inexpensive and easily moldable compound and is advantageous particularly when the obtained crosslinked butyl rubber is used as a hard rubber roller, a packing for high-pressure-steam pipe, etc.

In the present crosslinking of butyl rubber with alkylphenol-formaldehyde resin, hydrazide compound and epoxy compound, there are added, to 100 parts by weight of a butyl rubber, 5 to 25 parts by weight of an alkylphenol-formaldehyde resin, 0.1 to 5 parts by weight of a hydrazide compound and 0.3 to 10 parts by weight of an epoxy compound, followed by crosslinking.

The epoxy compound used in the present invention refers to epoxy resins and low-molecular epoxy compounds, and can be any epoxy resin or compound as long as it can be effectively used in the present crosslinking of butyl rubber. As specific examples of the epoxy compound, there can be mentioned a bisphenol A type epoxy resin, a bisphenol F type epoxy resin, a bisphenol AD type epoxy resin, a bisphenol type epoxy resin obtained by substituting one methyl group added to the skeleton of bisphenol AD type epoxy resin, with an alkyl group having 2 to 12 carbon atoms, a phenolic novolac type epoxy resin, a cresol novolac type epoxy resin, a triphenylmethane type polyfunctional epoxy resin, an alicyclic epoxy compound, a naphthol-modified novolac type epoxy resin and an epoxy compound of glycidyl o-, m- or p-phthalate or o-, m- or p-hydrophthalate type. The amount of the epoxy compound used is 0.3 to 10 parts by weight, preferably 0.5 to 8 parts by weight (when two or more kinds of epoxy compounds are used, the amount is their total amount) per 100 parts by weight of butyl rubber. When the amount of the epoxy compound used is less than 0.3 part by weight, no intended effect is obtained. When the amount is more than 10 parts by weight, no additional effect is obtained.

The epoxy compound used in the present invention is described in more detail below.

The bisphenol A type epoxy resin is a reaction product between bisphenol A and epichlorohydrin and is represented by the following structural formula (11):

(11)

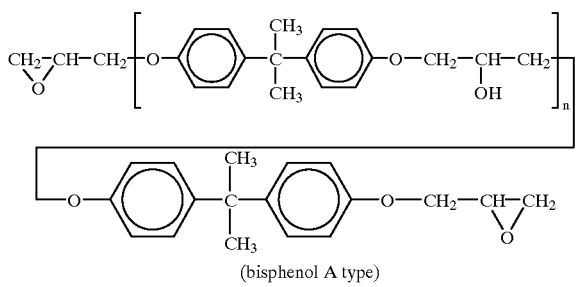

(bisphenol A type)

wherein n is 0 (zero) or a number larger than 0.

The bisphenol A type epoxy resin includes a liquid epoxy resin and a solid epoxy resin and has an epoxy equivalent of 900 g/eq or less. A bisphenol A type epoxy resin having an epoxy equivalent of 500 g/eq or less is preferred. The bisphenol A type epoxy resin preferably has a softening point of 110° C. or less as measured by the ring and ball method.

The bisphenol F or AD type epoxy resin is a reaction product between epichlorohydrin and bisphenol F or AD or a bisphenol obtained by substituting one methyl group added to the skeleton of bisphenol AD, with an alkyl group having 2 to 12 carbon atoms, and is represented by the following structural formulas (12) and (13):

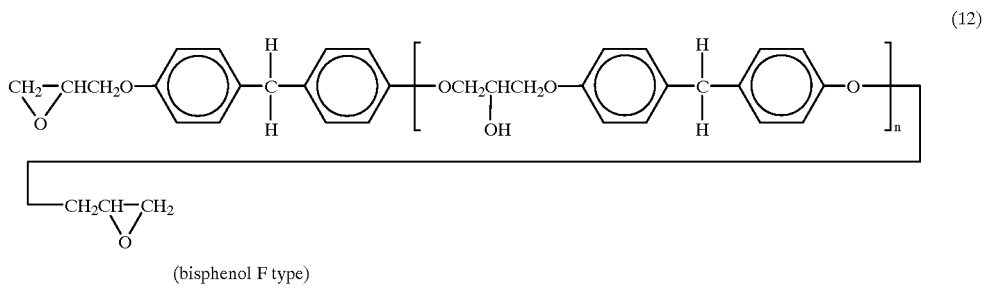

(bisphenol F type)

wherein n is 0 (zero) or a number larger than 0, and

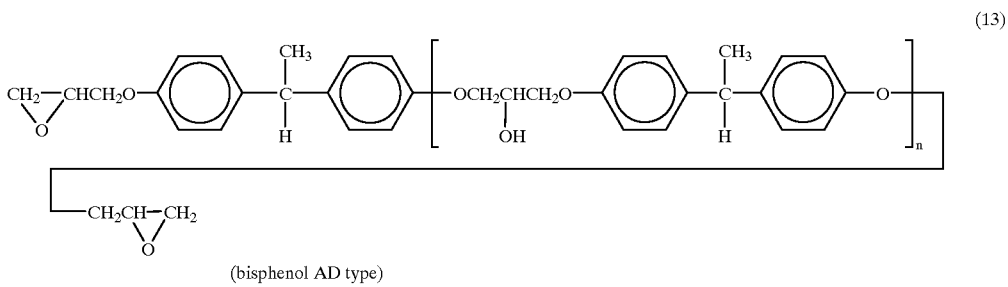

(bisphenol AD type)

wherein n is 0 (zero) or a number larger than 0.

The present invention includes also a bisphenol type epoxy resin obtained by substituting one methyl group added to the skeleton of bisphenol AD type, with an alkyl group having 2 to 12 carbon atoms. The epoxy resin preferably has an epoxy equivalent of 300 g/eq or less.

The phenolic novolac type epoxy resin is a reaction product between a phenolic novolac resin and epichlorohydrin and is represented by the following structural formula (14):

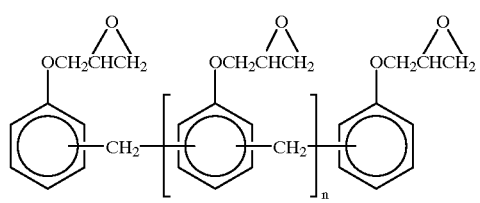

wherein n is 0 (zero) or a number larger than 0.

There is preferred a phenolic novolac type epoxy resin having an epoxy equivalent of 300 g/eq or less and a softening point of 110° C. or less as measured by the ring and ball method.

The cresol novolac type epoxy resin is a reaction product between an o-cresol novolac resin and epichlorohydrin and is represented by the following structural formula (15):

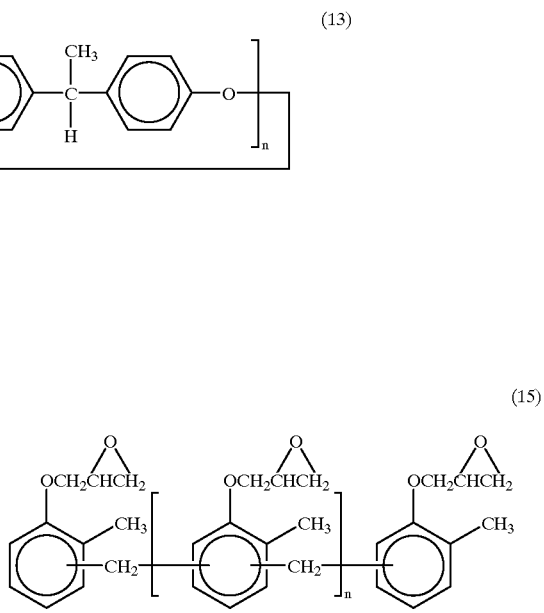

wherein is 0 (zero) or a number larger than 0.

There is preferred a cresol novolac type epoxy resin having an epoxy equivalent of 300 g/eq or less and a softening point of 110° C. or less as measured by the ring and ball method.

As the naphthol-modified novolac type epoxy resin, there can be used, for example, those having an epoxy equivalent of 225 to 245 g/eq and commercially available as NC-7000 and 7020 series (trade names, products of Nippon Kayaku Co., Ltd.). These resins have a softening point of 110° C. or less as measured by the ring and ball method.

The naphthol-modified novolac type epoxy resin is represented by the following structural formula (16):

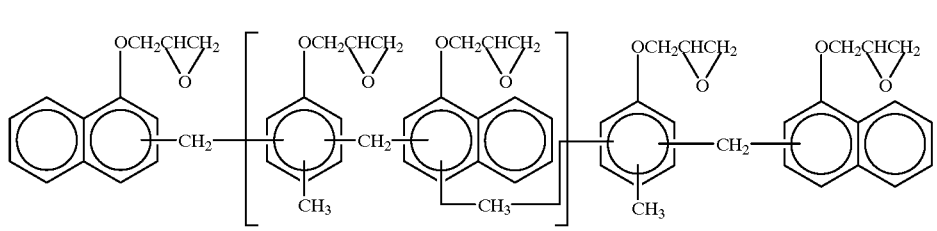

wherein n is 0 (zero) or a number larger than 0.

The triphenylmethane polyfunctional epoxy resin is, for example, epoxy resins represented by the following structural formulas (17) and (18):

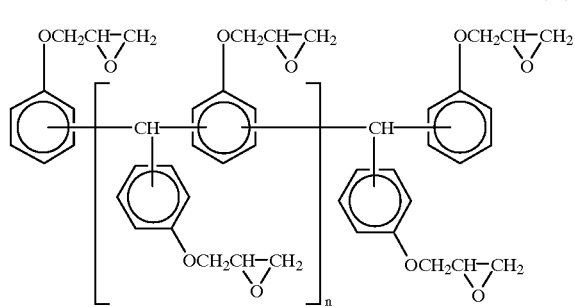

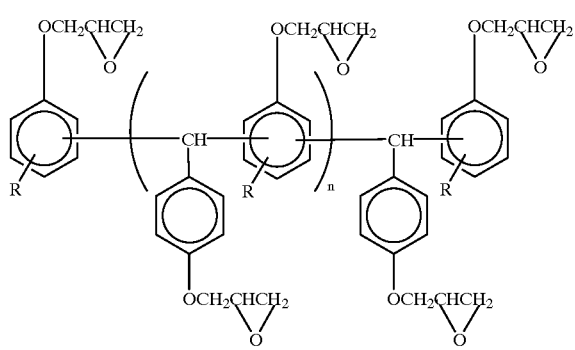

wherein R is a hydrogen atom or an alkyl group, and n is 0 (zero) or a number larger than 0.

The triphenylmethane polyfunctional epoxy resin is commercially available as EPPN 500 series and FAE series (trade names, products of Nippon Kayaku Co., Ltd.) and has an epoxy equivalent of 300 g/eq or less and a softening point of 100° C. or less as measured by the ring and ball method.

The alicyclic epoxy compound is a compound obtained by oxidizing and epoxidizing the double bond of cyclohexene ring, and includes alicyclic epoxy compounds such as alicyclic diepoxy acetal, alicyclic diepoxy adipate, alicyclic diepoxy carboxylate, vinylcyclohexene dioxide and the like. The alicyclic epoxy compound is a liquid compound having an epoxy equivalent of 300 g/eq or less.

The structural formulas of alicyclic diepoxy adipate and alicyclic diepoxy carboxylate are shown by the following structural formulas (19) and (20):

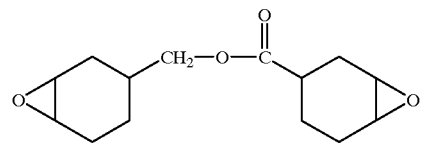

(alicyclic diepoxy carboxylate)

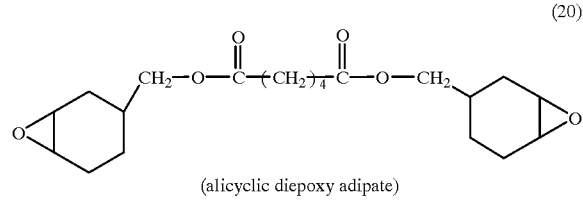

(alicyclic diepoxy adipate)

The epoxy resin of glycidyl o-, m- or p-phthalate or o-, m- or p-hydrophthalate type is a reaction product between epichlorohydrin and o-, m- or p-phthalic acid or o-, m- or p-hydrophthalic acid wherein the aromatic ring is hydrogenated. Examples thereof are compounds such as diglycidyl phthalate, diglycidyl tetrahydrophthalate, dimethylglycidyl phthalate, glycidyl ester of dimer acid, diglycidyl hexahydrophthalate, dimethylglycidyl hexahydrophthalate and the like. There is preferred a compound having an epoxy equivalent of 300 g/eq or less.

The structural formula of diglycidyl tetrahydrophthalate is shown by the following structural formula (21):

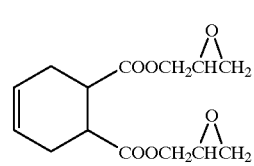

Of these epoxy compounds, preferably used are the triphenylmethane type polyfunctional epoxy resin, the cresol novolac type epoxy resin, etc.

In carrying out the crosslinking of butyl rubber using an alkylphenol-formaldehyde resin, a hydrazide compound and an epoxy compound according to the present invention, there is no particular restriction as to the crosslinking conditions. Ordinarily, however, primary crosslinking is conducted at 170 to 210° C. for 5 to 20 minutes by the use of a hot press used by those skilled in the art. Secondary crosslinking is not always necessary, but it is effective in order to obtain a crosslinked rubber showing a small hardness change during the long use. Secondary crosslinking, when required, can be conducted at 170 to 210° C. for 30 minutes to 3 hours.

To butyl rubber can as necessary be added, in addition to the alkylphenol-formaldehyde resin, the hydrazide compound and the epoxy compound all used as crosslinking agents, various fillers ordinarily used in rubbers, such as carbon black, talc, kaolin clay (kaolinite), calcium carbonate, softener, zinc oxide, stearic acid and the like.

The fillers usable in the present invention are substances added as base materials in order to improve the properties (e.g. strength and durability) of final product, and substances added for the weight or volume increase or cost reduction of final product. Specific examples of the fillers are carbon blacks such as channel black, furnace black and the like; fine particle silicic acids such as dry method white carbon (silica), wet method white carbon (silica) and the like; silicate, calcium carbonate, kaolinite (clay) or calcinated clay obtained by calcination of kaolinite (clay); hydrous magnesium silicate (talc); zinc oxide; magnesium oxide; and so forth. They can be used as necessary. When there is produced a crosslinked rubber product of high hardness without reducing the electrical insulation, the amount of carbon black added is preferably 60 parts by weight or less per 100 parts by weight of butyl rubber.

Besides, there can also be added substances such as stearic acid, antioxidant, paraffin wax, AC polyethylene and the like.

DESCRIPTION OF THE PREFERRED EMBODIMENTS

The present invention is described in more detail below by way of Examples and Comparative Examples.

In the following Tables, the amount of each raw material used is by parts by weight.

The properties of each crosslinked rubber were measured according to JIS K 6301.

Each crosslinking curve was obtained by the torque measurement made using an oscillating rheometer (ASTM-100 type) produced by Toyo Seiki Seisaku-sho, Ltd.

Examples 1–3 and Comparative Examples 1–2

Figure 2:
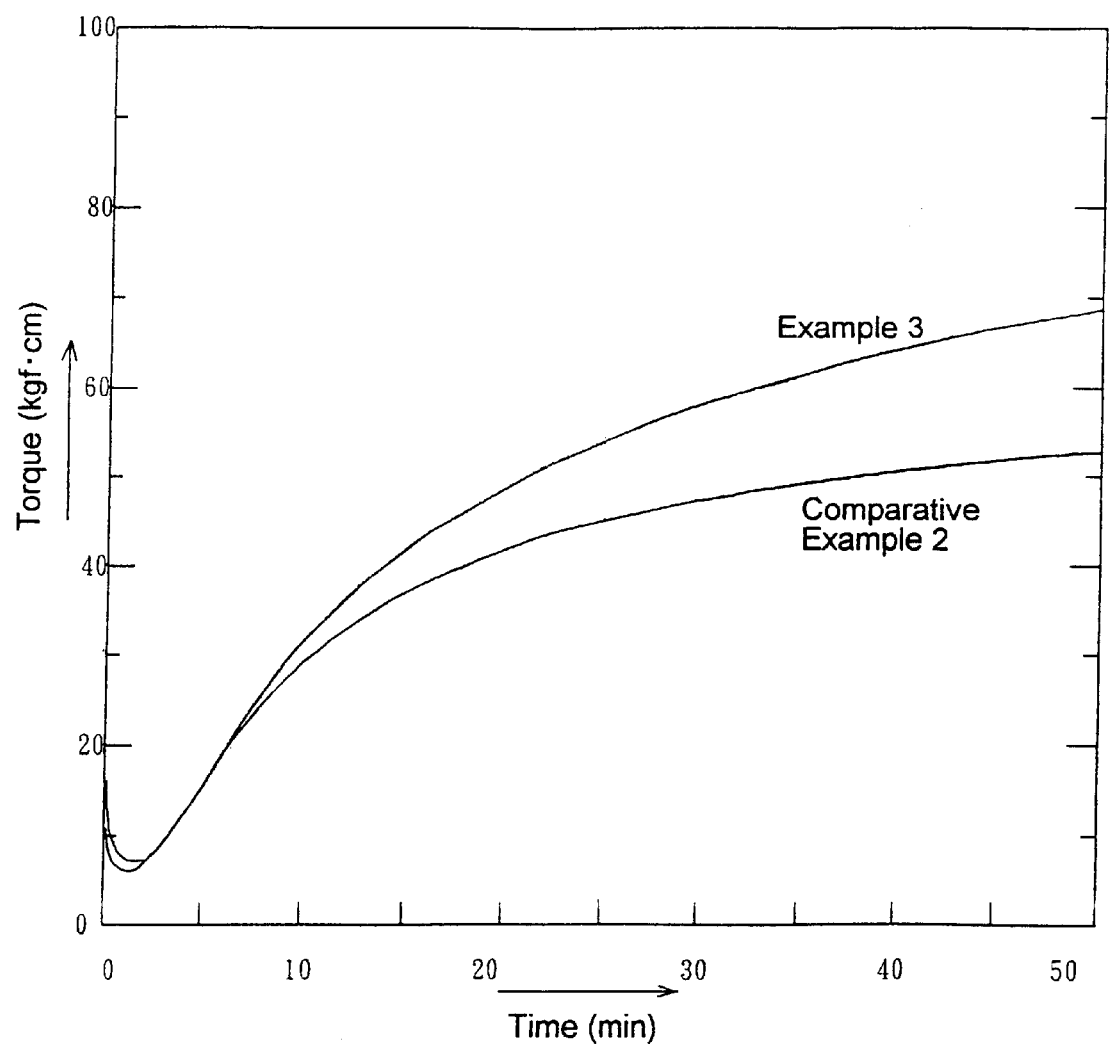
FIG. 2 shows the crosslinking curves of Example 3 and Comparative Example 2 obtained by the torque measurement made at 190° C. by the use of an oscillating rheometer.

Primary crosslinking was conducted at 190° C. for 10 minutes using a hot press, for each compounding recipe shown in Table 1 wherein the amounts of alkylphenol-formaldehyde resin and decamethylenedicarboxylic acid disalicyloylhydrazide (hereinafter abbreviated to DMDH) were different in each Example and each Comparative Example. Then, secondary crosslinking was conducted at 200° C. for 2 hours using a hot air convection oven. In FIG. 1 are shown the crosslinking curves of Example 2 and Comparative Example 1 obtained by the torque measurement made at 190° C. by the use of an oscillating rheometer; in FIG. 2 are shown the crosslinking curves of Example 3 and Comparative Example 2 obtained by the torque measurement made similarly. In Table 2 are shown the properties of the crosslinked rubbers obtained in Examples 1 to 3 and Comparative Examples 1 to 2.

As is clear from the crosslinking curves of FIG. 1 and FIG. 2, DMDH shows an effect of crosslinking acceleration in the crosslinking of a butyl rubber with 10 parts by weight of an alkylphenol-formaldehyde resin.

As is clear from the comparison of Examples 1 and 2 with Comparative Example 1 in Table 2, DMDH also shows an effect of significant hardness increase in the crosslinking of a butyl rubber with 10 parts by weight of an alkylphenol-formaldehyde resin.

As is clear from the comparison of Example 3 with Comparative Example 2 in Table 2, DMDH shows an effect of significant hardness increase as well in the crosslinking of a butyl rubber with 17 parts by weight of an alkylphenol-formaldehyde resin.

TABLE 1

| Butyl 365 (1) | 100 |
|---|---|
| FT carbon (2) | 40 |
| Calcinated clay (3) | 40 |
| Talc (4) | 10 |
| Phenolic resin (5) | Described in Table 2 |
| DMDH (6) | Described in Table 2 |

Notes for Table 1
(1): Butyl 365, a product of EXXON Kagaku K. K. was used.
(2): Asahi Thermal, a product of Asahi Carbon Co., Ltd. was used.
(3): Ice Berg of Burges Pigment Co. was used.
(4): A product of Tsuchiya Kaolin Kogyo K. K. was used.
(5): TACKIROL 201, a product of Taoka Chemical Co., Ltd. was used.
(6): A product of Asahi Denka Kogyo K. K. was used.

TABLE 2

|  | Example 1 | Example 2 | Comparative Example 1 | Example 3 | Comparative Example 2 |
|---|---|---|---|---|---|
| Phenolic resin (amount) | 10 | 10 | 10 | 17 | 17 |
| DMDH (amount) | 5 | 2 | 0 | 3 | 0 |
| Tensile strength (kg/cm²) | 70 | 68 | 83 | 64 | 65 |
| Elongation (%) | 280 | 350 | 640 | 310 | 530 |
| Compression set (125° C./72 H) | 35 | 38 | 40 | 40 | 41 |
| Hardness, JIS-A | 65 | 64 | 53 | 64 | 54 |
| Hardness increase (1) | +12 | +11 | — | +10 | — |
| I.R.H.D. hardness (2) | 63 | 60 | 49 | 61 | 51 |
| Hardness increase (1) | +14 | +11 | — | +10 | — |

Note
(1): (Example hardness) - (Comparative Example hardness)
(2): A hardness meter of Wallace Co. was used.

Examples 4 to 5 and Comparative Examples 3 to 4

Primary crosslinking was conducted at 190° C. for 10 minutes using a hot press, for each compounding recipe shown in Table 3 wherein the amounts of alkylphenol-formaldehyde resin and DMDH were different in each Example and each Comparative Example. Then, secondary crosslinking was conducted at 200° C. for 2 hours using a hot air convection oven.

Figure 3:
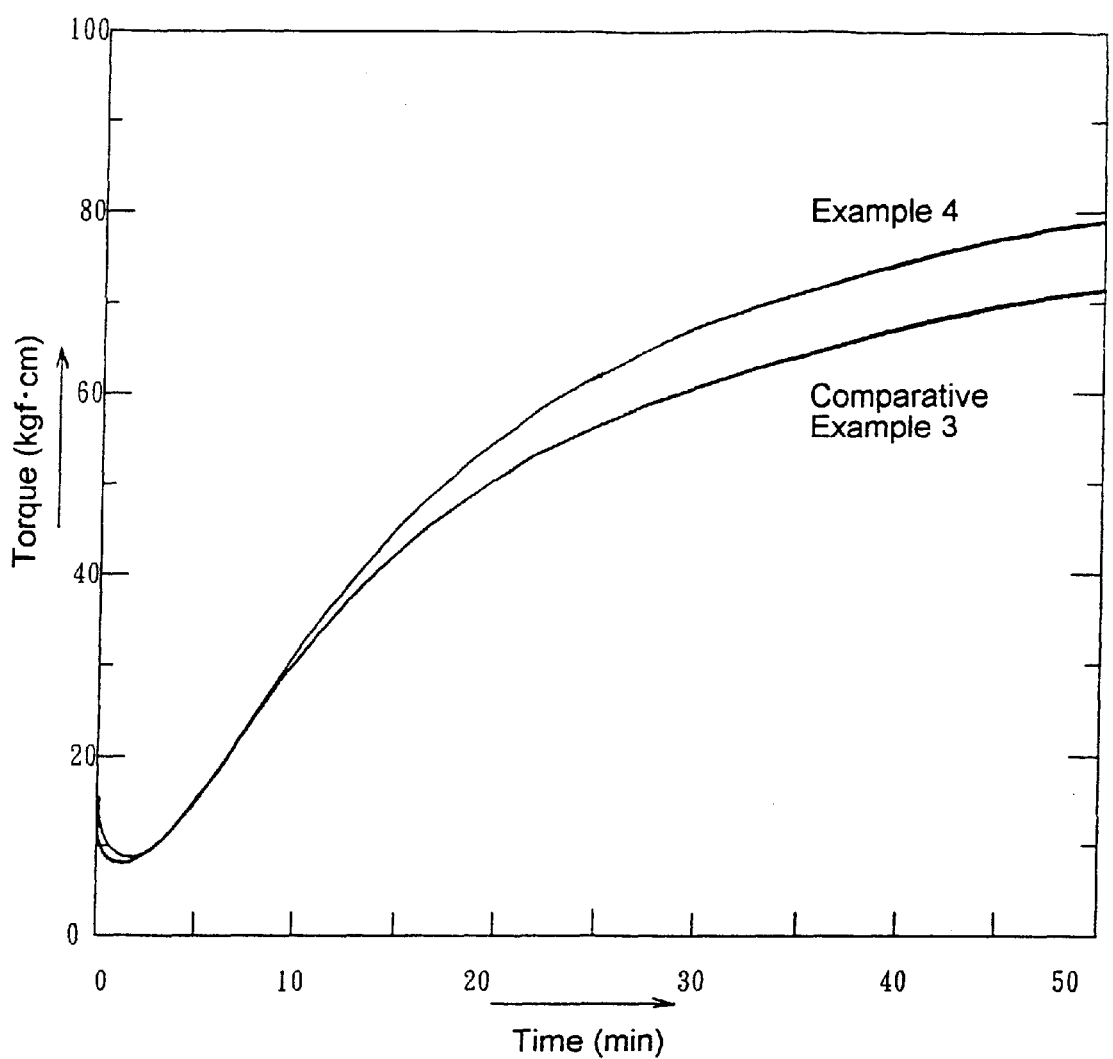
FIG. 3 shows the crosslinking curves of Example 4 and Comparative Example 3 obtained by the torque measurement made at 190° C. by the use of an oscillating rheometer.

In FIG. 3 are shown the crosslinking curves of Example 4 and Comparative Example 3 obtained by the torque measurement made at 190° C. by the use of an oscillating rheometer. In Table 4 are shown the properties of the crosslinked rubbers obtained in Examples 4 to 5 and Comparative Examples 3 to 4.

As is clear from the crosslinking curves of FIG. 3, DMDH shows an effect of crosslinking acceleration in the crosslinking of a butyl rubber with 16 parts by weight of an alkylphenol-formaldehyde resin. As is clear from the comparison of Example 4 with Comparative Example 3 in Table 4, DMDH also shows an effect of significant hardness increase in the crosslinking of a butyl rubber with 16 parts by weight of an alkylphenol-formaldehyde resin.

As is clear from the comparison of Example 5 with Comparative Example 4 in Table 4, similar results were obtained in the crosslinking of a butyl rubber with 18 parts by weight of an alkylphenol-formaldehyde resin.

TABLE 3

| Butyl 365 (1) | 100 |
| FT carbon (2) | 50 |
| Calcinated clay (3) | 20 |
| Nulok 390 (4) | 30 |
| Phenolic resin (5) | Described in Table 4 |
| DMDH (6) | Described in Table 4 |

Notes for Table 3
(1), (2), (3), (5), (6): The same products as (1), (2), (3), (5) and (6) of Table 1.
(4): An aminosilane-treated clay, a product of J. M. Huber Corporation was used.

TABLE 4

|  | Example 4 | Comparative Example 3 | Example 5 | Comparative Example 4 |
|---|---|---|---|---|
| Phenolic resin (amount) | 16 | 16 | 18 | 18 |
| DMDH (amount) | 1.5 | 0 | 2 | 0 |
| Tensile strength (kg/cm$^2$) | 115 | 105 | 120 | 110 |
| Elongation (%) | 310 | 370 | 340 | 380 |
| Compression set (125° C./72 H) | 39 | 36 | 38 | 36 |
| Hardness, JIS-A | 68 | 63 | 67 | 61 |
| Hardness increase (1) | +5 | — | +6 | — |
| I.R.H.D. hardness (2) | 70 | 65 | 71 | 63 |
| Hardness increase (1) | +5 | — | +8 | — |

Note (1):(Example hardness) - (Comparative Example hardness)
(2): A hardness meter of Wallace Co. was used.

Examples 6 to 7 and Comparative Examples 5 to 7

Figure 4:
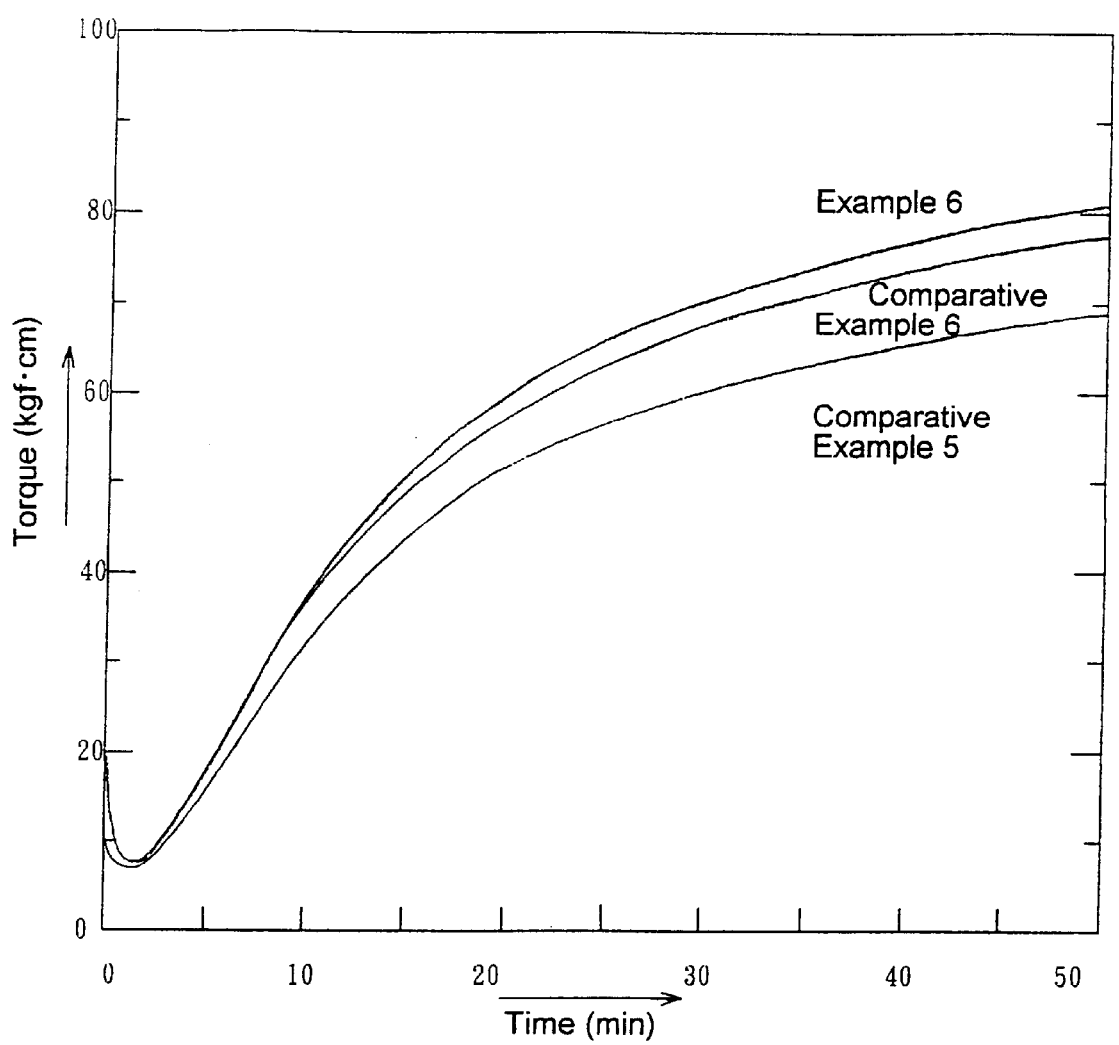
FIG. 4 shows the crosslinking curves of Example 6 and Comparative Examples 5 and 6 obtained by the torque measurement made at 190° C. by the use of an oscillating rheometer.

Primary crosslinking was conducted at 190° C. for 10 minutes using a hot press, for each compounding recipe shown in Table 5 wherein 18 parts by weight of an alkylphenol-formaldehyde resin, 2 parts by weight of an epoxy resin and DMDH were used in combination. Then, secondary crosslinking was conducted at 200° C. for 2 hours using a hot air convection oven. In FIG. 4 are shown the crosslinking curves of Example 6 and Comparative Examples 5 and 6 obtained by the torque measurement made at 190° C. by the use of an oscillating rheometer. In Table 6 are shown the properties of the crosslinked rubbers obtained in Examples 6 to 7 and Comparative Examples 5 to 7.

As is clear from the comparison of Example 6 with Comparative Examples 5 and 6, DMDH, when used in combination with a cresol novolac type epoxy resin, shows an increase in hardness as seen in Table 6 and, moreover, shows an effect of crosslinking acceleration as seen in FIG. 4, in the crosslinking of butyl rubber with alkylphenol-formaldehyde resin.

As is clear from the comparison of Example 7 with Comparative Example 7, DMDH, when used in combination with a bisphenol F type epoxy resin, shows an increase in hardness as seen in Table 6 and, moreover, shows an effect of crosslinking acceleration, in the crosslinking of butyl rubber with alkylphenol-formaldehyde resin.

These Examples indicate that an increase in hardness is possible without resorting to an increase in the amount of carbon black used.

TABLE 5

| Butyl 365 (1) | 100 |
| FT carbon (2) | 50 |
| Zinc oxide No. 3 | 20 |
| Calcium carbonate | 10 |
| Calcinated clay (3) | 50 |
| Burges KE (4) | 30 |
| Phenolic resin (5) | 18 |
| Epoxy resin (6) | 2 |
| DMDH (7) | Described in Table 6 |

Notes for Table 5
(1), (2), (3): The same products as (1) to (3) of Table 1.
(4): A surface-treated clay of Burges Pigment Co. was used.
(5), (7): The same products as (5) and (6) of Table 1.
(6): Described in Table 6.

TABLE 6

|  | Example 6 | Comparative Example 5 | Comparative Example 6 | Example 7 | Comparative Example 7 |
|---|---|---|---|---|---|
| Phenolic resin (amount) | 18 | 18 | 18 | 18 | 18 |
| Epoxy resin (Kind) | 1020 (1) |  | 1020 (1) | YL983 (2) | YL983 (2) |
| (Amount) | 2 | 0 | 2 | 2 | 2 |
| DMDH (amount) | 1 | 0 | 0 | 2 | 0 |
| Tensile strength (kg/cm$^2$) | 72 | 67 | 73 | 68 | 64 |
| Elongation (%) | 340 | 630 | 350 | 400 | 420 |
| Compression set (125° C./72 H) | 42 | 39 | 41 | 40 | 43 |
| Hardness, JIS-A | 69 | 58 | 65 | 70 | 65 |
| Hardness increase | +4 (3) |  |  | +5 (5) |  |
|  | +11 (4) |  |  | +12 (6) |  |
| I.R.H.D. hardness | 75 | 59 | 71 | 76 | 72 |
| Hardness increase | +4 (3) |  |  | +4 (5) |  |
|  | +16 (4) |  |  | +17 (6) |  |

Notes
(1): There was used EOCN 1020 which is a cresol novolac type epoxy resin produced by Nippon Kayaku Co., Ltd.
(2): There was used Epikote YL983 which is a bisphenol F type epoxy resin produced by Yuka Shell Epoxy K. K.
(3): (Example 6 hardness) - (Comparative Example 6 hardness)
(4): (Example 6 hardness) - (Comparative Example 5 hardness)
(5): (Example 7 hardness) - (Comparative Example 7 hardness)
(6): (Example 7 hardness) - (Comparative Example 5 hardness)

Examples 8 to 9 and Comparative Examples 8 to 10

Primary crosslinking was conducted at 190° C. for 10 minutes using a hot press, for each compounding recipe shown in Table 7 wherein 18 parts by weight of an alkylphenol-formaldehyde resin, 4 parts by weight of an epoxy resin and DMDH were used in combination. Then, secondary crosslinking was conducted at 200° C. for 2 hours using a hot air convection oven. In Table 8 are shown the properties of the crosslinked rubbers obtained in Examples 8 to 9 and Comparative Examples 8 to 10.

As is clear from the comparison of Example 8 with Comparative Examples 8 and 9, DMDH, when used in combination with a phenol novolac type epoxy resin, shows an increase in hardness as seen in Table 8.

As is clear from the comparison of Example 9 with Comparative Example 10, DMDH, when used in combination with an alicyclic diepoxy adipate, shows an increase in hardness as seen in Table 8.

These Examples indicate that an increase in the hardness of crosslinked rubber is possible without resorting to an increase in the amount of carbon black used.

TABLE 7

| Butyl 365 (1) | 100 |
| FT carbon (2) | 50 |
| Zinc oxide No. 3 | 15 |
| Calcium carbonate | 5 |
| Calcinated clay (3) | 50 |
| Burges KE (4) | 30 |
| Nulok 390 (5) | 50 |
| Phenolic resin (6) | 18 |
| Epoxy resin (7) | 4 |
| DMDH (8) | Described in Table 8 |

Notes for Table 7
(1), (2), (3): The same products as (1) to (3) of Table 1.
(6), (8): The same products as (5) and (6) of Table 1.
(4): The same product as (4) of Table 5.
(5): The same product as (4) of Table 3.
(7): Described in Table 8.

Figure 5:
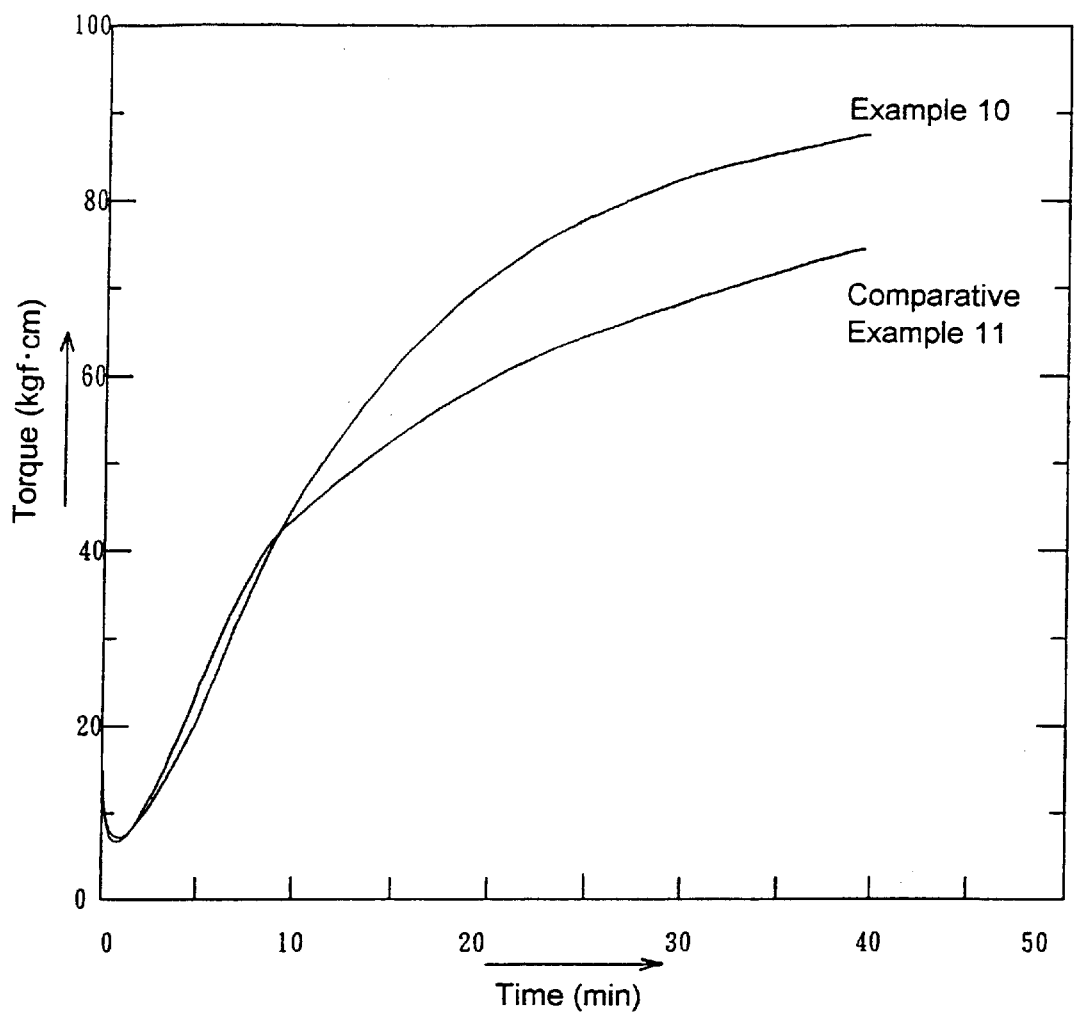
FIG. 5 shows the crosslinking curves of Example 10 and Comparative Example 11 obtained by the torque measurement made at 190° C. by the use of an oscillating rheometer.

Comparative Examples 11 to 13. In FIG. 5 are shown the crosslinking curves of Examples 10 and Comparative Example 11 obtained by the torque measurement made at 190° C.

As is clear from the crosslinking curves of FIG. 5, DMDH shows an effect of crosslinking acceleration in the crosslinking of a butyl rubber with 18 parts by weight of an alkylphenol-formaldehyde resin and a triphenylmethane type epoxy resin.

As is clear from the comparison of Example 10 with Comparative Example 11 in Table 10, DMDH shows an increase in hardness with no increase in the amount of carbon black added, in the crosslinking of a butyl rubber with 18 parts by weight of an alkylphenol-formaldehyde resin.

As is clear from the comparison of Example 11 with Comparative Example 12 or from the comparison of Example 12 with Comparative Example 13 in Table 10, DMDH shows an increase in hardness with no increase in the amount of carbon black added, also in the crosslinking of a butyl rubber with 18 parts by weight of an alkylphenol-formaldehyde resin and a cresol novolac type epoxy resin or a naphthol-modified epoxy resin.

TABLE 9

| Butyl 365 (1) | 100 |
| FT carbon (2) | 50 |
| Calcinated clay (3) | 100 |
| Zinc oxide No. 3 | 5 |
| Stearic acid | 1 |
| Phenolic resin (4) | 18 |

TABLE 8

|  | Example 8 | Comparative Example 8 | Comparative Example 9 | Example 9 | Comparative Example 10 |
|---|---|---|---|---|---|
| Phenolic resin (amount) | 18 | 18 | 18 | 18 | 18 |
| Epoxy resin (Kind) | 201 (1) |  | 201 (1) | CY177 (2) | CY177 (2) |
| (Amount) | 4 | 0 | 4 | 4 | 4 |
| DMDH (amount) | 1 | 0 | 0 | 2 | 0 |
| Tensile strength (kg/cm²) | 80 | 73 | 88 | 74 | 71 |
| Elongation (%) | 220 | 550 | 260 | 280 | 370 |
| Compression set (125° C./72 H) | 45 | 40 | 43 | 45 | 47 |
| Hardness, JIS-A | 78 | 60 | 74 | 77 | 72 |
| Hardness increase | +4 (3) |  |  | +5 (5) |  |
|  | +18 (4) |  |  | +17 (6) |  |
| I.R.H.D. hardness | 88 | 67 | 86 | 88 | 85 |
| Hardness increase | +2 (3) |  |  | +3 (5) |  |
|  | +16 (4) |  |  | +21 (6) |  |

Notes
(1): There was used EPPN 201 which is a phenolic novolac type epoxy resin produced by Nippon Kayaku Co., Ltd.
(2): There was used Araldite CY 177 which is an alicyclic epoxy resin produced by Ciba Specialty Chemicals K. K.
(3): (Example 8 hardness) - (Comparative Example 9 hardness)
(4): (Example 8 hardness) - (Comparative Example 8 hardness)
(5): (Example 9 hardness) - (Comparative Example 10 hardness)
(6): (Example 9 hardness) - (Comparative Example 8 hardness)

Examples 10 to 12 and Comparative Examples 11 to 13

As shown in Tables 9 and 10, there were used 18 parts by weight of an alkylphenol-formaldehyde resin, 2 parts by weight of DMDH and 1.5 parts by weight of an epoxy resin (selected from three kinds of epoxy resins) in Examples 10 to 12. No DMDH was used in Comparative Examples 11 to 13.

Primary crosslinking was conducted at 190° C. for 10 minutes using a hot press, after which secondary crosslinking was conducted at 200° C. for 2 hours in a hot air convection oven. In Table 10 are shown the properties of the crosslinked rubbers obtained in Examples 10 to 12 and TABLE 9-continued

| Epoxy resin (5) | 1.5 |
| DMDH (6) | 2 |

Notes for Table 9
(1), (2), (3): The same products as (1) to (3) of Table 1.
(4), (6): The same products as (5) and (6) of Table 1.
(5): Described in Table 10.

TABLE 10

|  | Example 10 | Comparative Example 11 | Example 11 | Comparative Example 12 | Example 12 | Comparative Example 13 |
|---|---|---|---|---|---|---|
| Phenolic resin (amount) | 18 | 18 | 18 | 18 | 18 | 18 |
| Epoxy resin (Kind) | 501 (1) | 501 (1) | 103S (2) | 103S (2) | NC7000 (3) | NC7000 (3) |
| (Amount) | 1.5 | 1.5 | 1.5 | 1.5 | 1.5 | 1.5 |
| DMDH (amount) | 2 | 0 | 2 | 0 | 2 | 0 |
| Tensile strength (kg/cm$^2$) | 78 | 81 | 79 | 82 | 77 | 79 |
| Elongation (%) | 160 | 170 | 160 | 170 | 150 | 160 |
| Compression set (125° C./72 H) | 18 | 17 | 19 | 18 | 20 | 19 |
| Hardness, JIS-A | 85 | 80 | 86 | 82 | 88 | 83 |
| Hardness increase | +5 (4) |  | +4 (5) |  | +5 (6) |  |
| I.R.H.D. hardness | 82 | 78 | 83 | 77 | 85 | 79 |
| Hardness increase | +4 (4) |  | +6 (5) |  | +6 (6) |  |

Notes
(1): There was used EPPN 501 which is a triphenylmethane type epoxy resin produced by Nippon Kayaku Co., Ltd.
(2): There was used EOCN 103S which is a cresol novolac type epoxy resin produced by Nippon Kayaku Co., Ltd.
(3): There was used NC 7000 which is a naphthol-modified epoxy resin produced by Nippon Kayaku Co., Ltd.
(4): (Example 10 hardness) - (Comparative Example 11 hardness)
(5): (Example 11 hardness) - (Comparative Example 12 hardness)
(6): (Example 12 hardness) - (Comparative Example 13 hardness)

Examples 13 to 17 and Comparative Example 14

Crosslinking was conducted at 190° C. for 20 minutes for the compounding recipes of Table 11. There were used 18 parts by weight of an alkylphenol-formaldehyde resin and 1 part by weight of a hydrazide compound. The hydrazide compound was sebacic acid hydrazide in Example 13, dodecanedioic acid dihydrazide in Example 14, adipic acid dihydrazide in Example 15, isophthalic acid hydrazide in Example 16 and decamethylenedicarboxylic acid disalicyloylhydrazide in Example 17. No hydrazide compound was used in Comparative Example 14.

Figure 6:
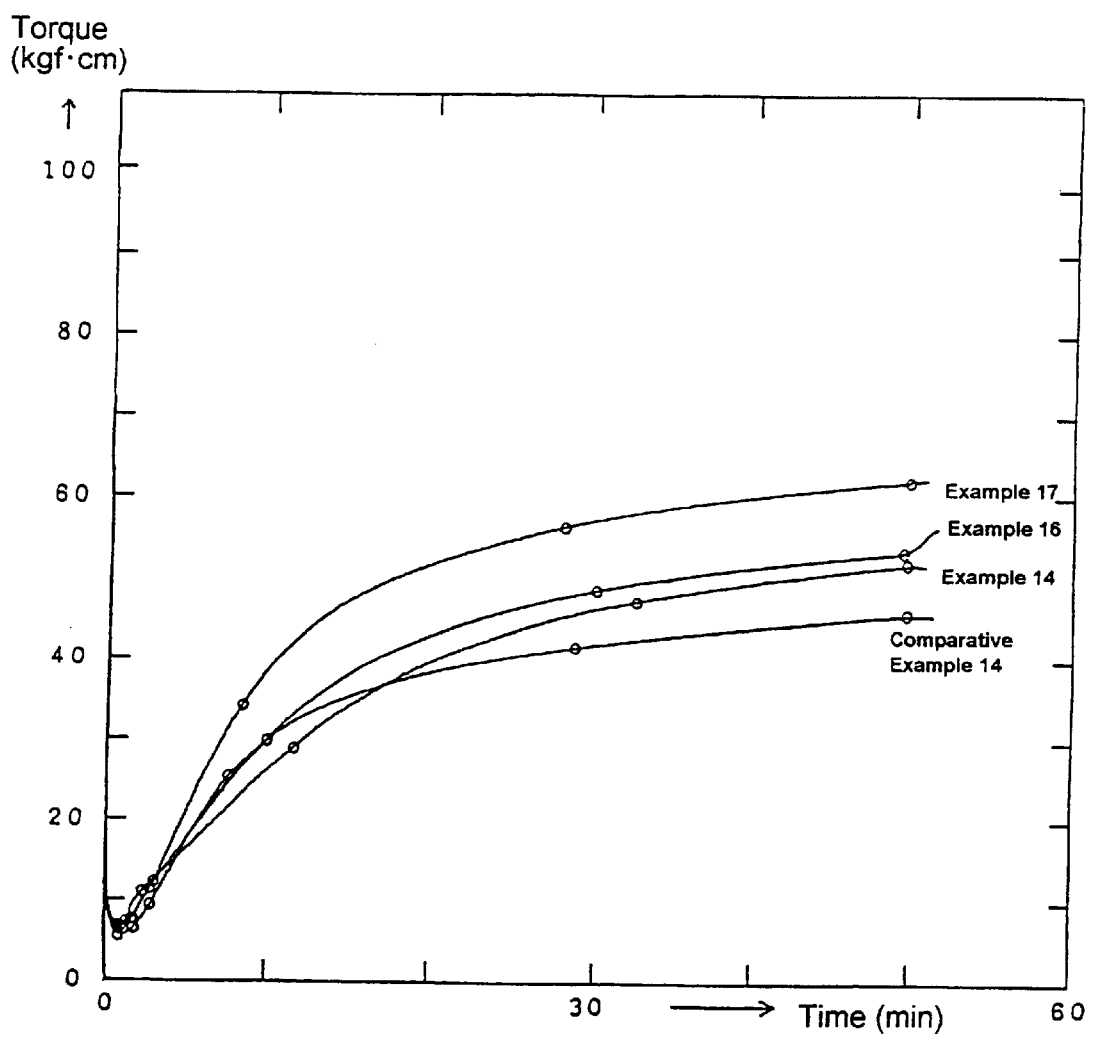
FIG. 6 shows the crosslinking curves of Examples 14, 16 and 17 and Comparative Example 14 obtained by the torque measurement made at 190° C. using an oscillating rheometer.

In FIG. 6 are shown the crosslinking curves of Examples 14, 16 and 17 and Comparative Example 14 obtained by the torque measurement at 190° C. using an oscillating rheometer.

In Table 12 are shown the properties of the crosslinked rubbers obtained in Examples 13 to 17 and Comparative Example 14.

As is clear from the crosslinking curves of FIG. 6, hydrazide compounds show an effect of crosslinking acceleration in the crosslinking of a butyl rubber with 18 parts by weight of an alkylphenol-formaldehyde resin.

As is clear from the comparison of Examples 13 to 17 with Comparative Example 14 in Table 12, addition of hydrazide compound gives a significant increase in hardness. A larger elongation (%) in Comparative Example 14 than in Examples is due to the low crosslink density of Comparative Example 14.

TABLE 11

| Butyl 365 (1) | 100 |
|---|---|
| FT carbon (2) | 40 |
| Calcinated clay (3) | 83 |
| Talc (4) | 12 |
| Calcium carbonate | 5 |
| Zinc oxide No. 3 | 3 |
| Stearic acid | 1 |
| Phenolic resin (5) | 18 |
| Hydrazide compound (6) | 1 |

Notes for Table 11
(1) to (5): The same products as (1) to (5) of Table 1.
(6): Described in Table 12.

TABLE 12

|  | Example 13 | Example 14 | Example 15 | Example 16 | Example 17 | Comparative Example 14 |
|---|---|---|---|---|---|---|
| Phenolic resin (amount) | 18 | 18 | 18 | 18 | 18 | 18 |
| Hydrazide compound (Amount) | 1 | 1 | 1 | 1 | 1 | 0 |
| (Kind) | (1) | (2) | (3) | (4) | (5) | — |
| Tensile strength (kg/cm$^2$) | 90 | 77 | 88 | 81 | 90 | 98 |
| Elongation (%) | 405 | 510 | 400 | 510 | 400 | 620 |
| Hardness, durometer-A Instantaneous value/3-second value | 78/74 | 82/76 | 78/74 | 78/73 | 74/68 | 58/54 |
| Hardness increase (6) | +20/+20 | +24/+22 | +20/+20 | +20/+19 | +16/+14 | — |
| I.R.H.D. hardness | 78 | 80 | 78 | 78 | 74 | 58 |
| Hardness increase (7) | +20 | +22 | +20 | +20 | +16 | — |

Notes
(1): There was used sebacic acid hydrazide which is a saturated aliphatic dibasic acid hydrazide produced by JAPAN HYDRAZINE CO., LTD.
(2): There was used dodecanedioic acid dihydrazide which is a saturated aliphatic dibasic acid dihydrazide produced by JAPAN HYDRAZINE CO., LTD.
(3): There was used adipic acid dihydrazide which is a saturated aliphatic dibasic acid dihydrazide produced by JAPAN HYDRAZINE CO., LTD.
(4): There was used isophthalic acid hydrazide which is a phthalic acid derivative produced by JAPAN HYDRAZINE CO., LTD.
(5): There was used decamethylenedicarboxylic acid disalicyloylhydrazide which is a derivative of a saturated aliphatic hydrazide and oxybenzoic acid, produced by Asahi Denka Kogyo K. K. The same product as Note (6) of Table 1.
(6), (7): (Examples 13–17 hardness) - (Comparative Example 14 hardness)

Examples 18 to 19 and Comparative Examples 15 to 16

Primary crosslinking was conducted at 190° C. for 20 minutes using a hot press and then secondary crosslinking was conducted at 200° C. for 2 hours, for each compounding recipe of Table 13 using 7 or 22 parts by weight of an alkylphenol-formaldehyde resin and 2 or 0.8 part by weight of dodecanedioic acid dihydrazide. In Table 14 are shown the properties of the crosslinked rubbers obtained in Examples 18 to 19 and Comparative Examples 15 to 16.

As is clear from the comparison of Example 18 with Comparative Example 15 and from the comparison of Example 19 with Comparative Example 16 in Table 14, addition of dodecanedioic acid dihydrazide gives a significant increase in hardness.

TABLE 13

| Butyl 268 (1) | 100 |
|---|---|
| FT carbon (2) | 40 |
| Calcinated clay (3) | 90 |
| Talc (4) | 10 |
| Calcium carbonate | 10 |
| Zinc oxide No. 3 | 4 |
| Stearic acid | 1.3 |
| Phenolic resin (5) | Described in Table 14 |
| Hydrazide compound (6) | Described in Table 14 |

Notes for Table 13
(1): Butyl 268, a product of EXXON Kagaku K. K. was used.
(2) to (5): The same products as (2) to (5) of Table 1.
(6): The same product as (2) of Table 12.

TABLE 14

|  | Example 18 | Comparative Example 15 | Example 19 | Comparative Example 16 |
|---|---|---|---|---|
| Phenolic resin (amount) | 7 | 7 | 22 | 22 |
| Hydrazide compound |  |  |  |  |
| (Amount) | 2 | 0 | 0.8 | 0 |
| (Kind) | (1) | — | (1) | — |
| Tensile strength (kg/cm$^2$) | 71 | 44 | 54 | 56 |
| Elongation (%) | 260 | 450 | 250 | 260 |
| Hardness, durometer-A |  |  |  |  |
| Instantaneous value/ 3-second value | 75/73 | 61/57 | 77/75 | 67/65 |
| Hardness increase | +14/+16 (2) | — | +20/+20 (3) | — |
| I.R.H.D. hardness | 75 | 61 | 78 | 68 |
| Hardness increase | +14 (2) | — | +10 (3) | — |

Notes
(1): The same product as Note (2) of Table 12.
(2): (Example 18 hardness) - (Comparative Example 15 hardness)
(3): (Example 19 hardness) - (Comparative Example 16 hardness)

Examples 20 to 22 and Comparative Example 17

Primary crosslinking was conducted at 190° C. for 20 minutes using a hot press and then secondary crosslinking was conducted at 200° C. for 2 hours, for each compounding recipe of Table 15 using 10 parts by weight of an alkylphenol-formaldehyde resin and 0.1 to 0.2 part by weight of a hydrazide compound.

Each crosslinked rubber obtained was measured for hardness (instantaneous value and 3-second value), using a durometer-A hardness tester. The same measurement was made also for the crosslinked rubber of Comparative Example 17 using no hydrazide compound. All the crosslinked rubbers were measured also for I.R.H.D. hardness.

The results of measurements are shown in Table 16.

It is clear that the use of dodecanedioic acid dihydrazide or adipic acid dihydrazide or the combined use of isophthalic acid hydrazide and dodecanedioic acid dihydrazide shows an effect of hardness increase in the crosslinking of butyl rubber with alkylphenol-formaldehdye resin. This is because each hydrazide compound has an effect of crosslinking acceleration and gives an increased crosslink density.

TABLE 15

| Butyl 268 (1) | 100 |
|---|---|
| FT carbon (2) | 45 |
| Calcinated clay (3) | 90 |
| Talc (4) | 15 |
| Calcium carbonate | 5 |
| Zinc oxide No. 3 | 4 |
| Stearic acid | 1.5 |
| Phenolic resin (5) | 10 |
| Hydrazide compound (6) | Described in Table 16 |

Notes for Table 15
(1): The same product as (1) of Table 13.
(2) to (5): The same products as (2) to (5) of Table 1.
(6): Described in Table 16.

TABLE 16

|  | Example 20 | Example 21 | Example 22 | Comparative Example 17 |
|---|---|---|---|---|
| Phenolic resin (amount) | 10 | 10 | 10 | 10 |
| Hydrazide compound |  |  |  |  |
| (Amount) | 0.2 | 0.1 | 0.1/0.1 | 0 |
| (Kind) | (1) | (2) | Combination use of (1) and (3) | — |
| Hardness, durometer-A |  |  |  |  |
| Instantaneous value/3-second value | 68/66 | 66/64 | 66/64 | 62/62 |
| Hardness increase (5) | +6/+4 | +4/+2 | +4/+2 | — |
| I.R.H.D. hardness | 66 | 65 | 66 | 62 |
| Hardness increase (6) | +4 | +3 | +4 | — |

Notes
(1): The same product as Note (2) of Table 12.
(2): The same product as Note (3) of Table 12.
(3): The same product as Note (4) of Table 12.
(5), (6): (Examples 20–22 hardness) - (Comparative Example 17 hardness)

Examples 23 to 27 and Comparative Example 18

Primary crosslinking was conducted at 190° C. for 20 minutes using a hot press and then secondary crosslinking was conducted at 200° C. for 2 hours, for each compounding recipe of Table 17 using 16 parts by weight of an alkylphenol-formaldehyde resin. In Examples 23 to 27, hydrazide compounds were added singly or in combination in different amounts, as shown in Table 18; in Comparative Example 18, no hydrazide compound was added. The properties of the crosslinked rubbers obtained are shown in Table 18.

Figure 7:
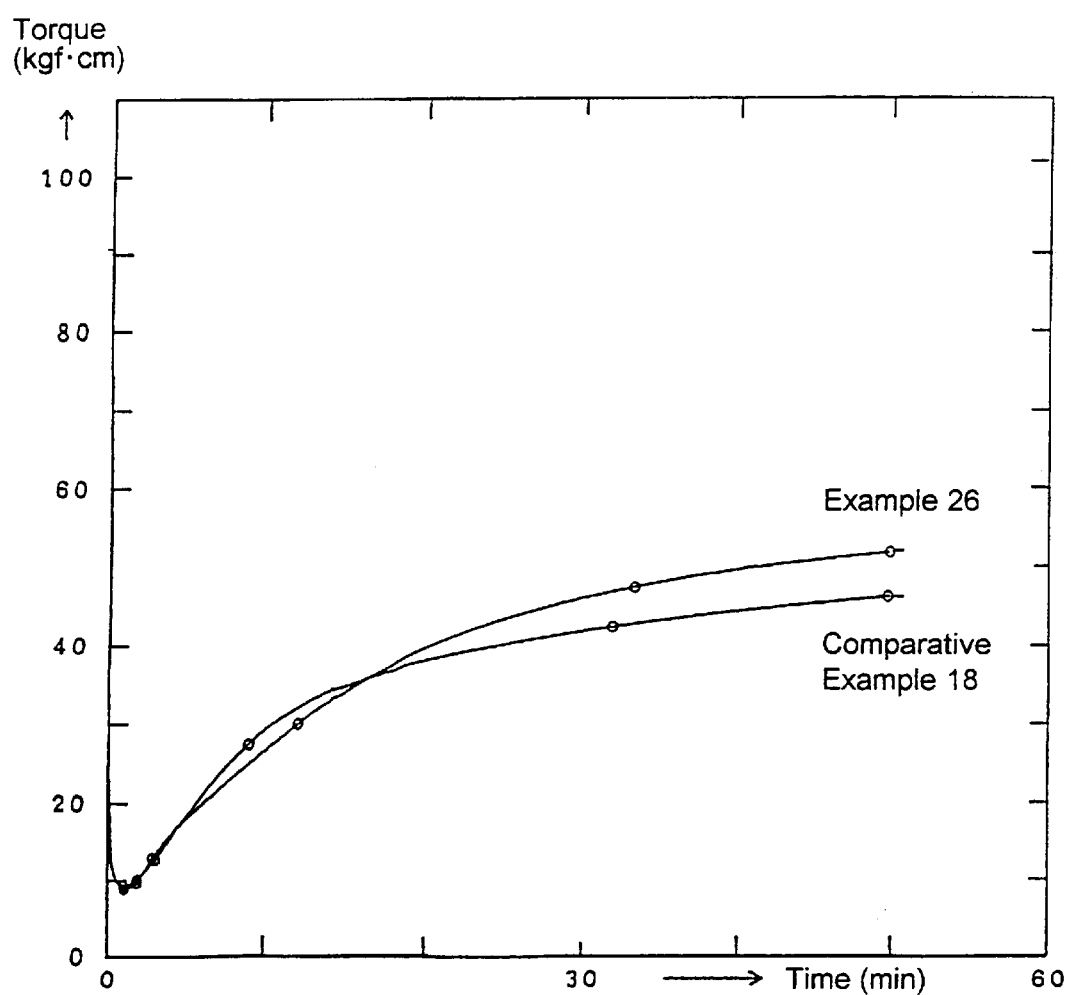
FIG. 7 shows the crosslinking curves of Example 26 and Comparative Example 18 obtained by the torque measurement made at 190° C. by the use of an oscillating rheometer.

In FIG. 7 are shown the crosslinking curves of Example 26 and Comparative Example 18 obtained by the torque measurement at 190° C. using an oscillating rheometer.

As is clear from the crosslinking curves of FIG. 7, a hydrazide compound(s) shows (show) an effect of crosslinking acceleration in the crosslinking of a butyl rubber with 16 parts by weight of an alkylphenol-formaldehyde resin.

As is clear from Table 18, addition of hydrazide compound in the resin crosslinking of butyl rubber gives a crosslinked rubber significantly increased in hardness.

TABLE 17

| | |
|---|---|
| Butyl 268 (1) | 100 |
| FT carbon (2) | 40 |
| Calcinated clay (3) | 100 |
| Talc (4) | 10 |
| Calcium carbonate | 5 |
| Zinc oxide No. 3 | 4 |
| Stearic acid | 1.5 |
| Phenolic resin (5) | 16 |
| Hydrazide compound (6) | Described in Table 18 |

Notes for Table 17
(1): The same product as (1) of Table 13.
(2) to (5): The same products as (2) to (5) of Table 1.
(6): Described in Table 18.

TABLE 18

| | Example 23 | Example 24 | Example 25 | Example 26 | Example 27 | Comparative Example 18 |
|---|---|---|---|---|---|---|
| Hydrazide | | | | | | |
| (Kind) | (1)/(2) | (1)/(3) | (2)/(4) | (5) | (6) | — |
| (Amount) | 3.5/0.2 | 3/1 | 0.8/0.2 | 1 | 1.5 | — |
| (Total amount) | 3.7 | 4 | 1 | 1 | 1.5 | — |
| Tensile strength (kg/cm²) | 51 | 52 | 54 | 51 | 53 | 50 |
| Elongation (%) | 200 | 215 | 250 | 310 | 260 | 360 |
| Hardness, durometer-A Instantaneous value/3-second value | 84/84 | 87/89 | 74/72 | 74/69 | 79/77 | 65/63 |
| Hardness increase (7) | +19/+21 | +22/+26 | +9/+9 | +9/+9 | +14/+14 | — |
| I.R.H.D. hardness | 89 | 90 | 73 | 72 | 76 | 66 |
| Hardness increase (8) | +23 | +24 | +7 | +6 | +10 | — |

Notes
(1): The same product as Note (5) of Table 12.
(2): The same product as Note (4) of Table 12.
(3): The same product as Note (2) of Table 12.
(4): Carbohydrazide produced by JAPAN HYDRAZINE CO., LTD. was used.
(5): There was used 1,3-bis(hydrazinocarboethyl)-5-isopropylhydantoin produced by Ajinomoto Co., Ltd.
(6): There was used 7,11-octadecadiene-1,18-dicarbohydrazide which is a derivative of an unsaturated aliphatic dicarboxylic acid produced by Ajinomoto Co., Ltd.
(7), (8): (Examples 23–27 hardness) - (Comparative Example 18 hardness)

According to the present method for resin crosslinking of butyl rubber, the crosslinking of butyl rubber is accelerated by the use of a hydrazide compound and there can be easily produced, without using any halogen compound as a crosslinking co-agent, a crosslinked butyl rubber having a high hardness of 80 or more in terms of JIS-A hardness and yet possessing required electrical insulation. Moreover, the crosslinked rubber product has good moldability, is excellent in electrical insulation, and shows low corrosivity to metals.

The feature of the present invention lies in that the hydrazide compound used is unique and exhibits three advantageous functions simultaneously, that is, (1) the hydrazide compound acts as a good crosslinking accelerator in the crosslinking of butyl rubber with alkylphenol-formaldehyde resin, (2) the hydrazide compound prevents the release of the chlorine contained in raw materials (e.g. butyl rubber, clay or carbon black) as an impurity, from the crosslinked rubber product, and (3) the hydrazide compound gives a crosslinked rubber product of high hardness with no increase in the amount of carbon black used.

What is claimed is:

1. A method for crosslinking an isoprene-isobutylene rubber, which comprises adding, to an isoprene-isobutylene rubber, an alkylphenol-formaldehyde resin, a hydrazide compound and an epoxy compound.

2. A method for crosslinking an isoprene-isobutylene rubber according to claim 1, wherein the alkylphenol-formaldehyde resin is a compound represented by the following formula (1):

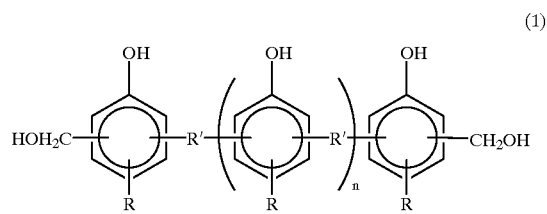

(1)

wherein n is 0 (zero) to 10, R is an aliphatic alkyl group having 1 to 10 carbon atoms, and R' is —CH$_2$— or —CH$_2$OCH$_2$—.

3. A method for crosslinking an isoprene-isobutylene rubber according to claim 1, wherein the hydrazide compound is at least one kind of compound selected from the group consisting of the dibasic acid dihydrazides and carbodihydrazide represented by the following formulas (2) to (5):

(2)

wherein X and Y may be the same or different and are each a hydrogen atom or an alkyl group having 1 to 5 carbon atoms; R is a hydrogen atom or a group represented by

(wherein R' is a hydrogen atom, a methyl group or a hydroxyl group); n is a number of 0 (zero) to 2; and m is a number of 0 (zero) to 20 (n and m are not 0 simultaneously),

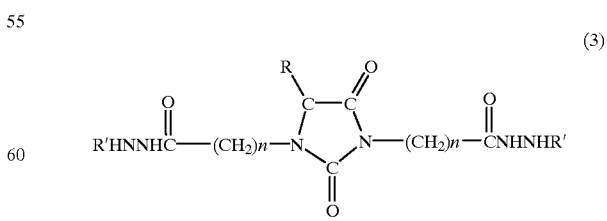

(3)

wherein R is a hydrogen atom or an alkyl group having 1 to 10 carbon atoms; R' is a hydrogen atom or a group represented by

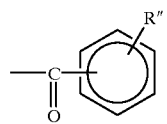

(wherein R" is a hydrogen atom, a methyl group or a hydroxyl group); and n is a number of 1 to 10, (4)

wherein R is a hydrogen atom or a group represented by

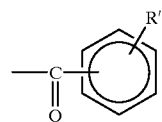

(wherein R' is a hydrogen atom, a methyl group or a hydroxyl group), and (5)

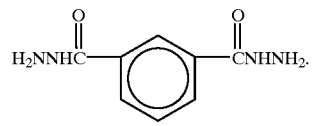

4. A method for crosslinking an isoprene-isobutylene rubber according to claim 1, wherein the hydrazide compound is at least one kind of hydrazide compound selected from the group consisting of carbodihydrazide, adipic acid dihydrazide, sebacic acid hydrazide, dodecanedioic acid dihydrazide, isophthalic acid hydrazide, maleic acid hydrazide, decamethylenedicarboxylic acid disalicyloylhydrazide, eicosanedioic acid dihydrazide, 7,11-octadecadiene-1,18-dicarbohydrazide, and 1,3-bis (hydrazinocarboethyl)-5-isopropylhydantoin.

5. A method for crosslinking an isoprene-isobutylene rubber according to claim 1, wherein the epoxy compound is at least one kind of epoxy compound selected from the group consisting of a bisphenol A epoxy resin, a bisphenol F epoxy resin, a bisphenol AD epoxy resin, a bisphenol epoxy resin obtained by substituting one methyl group added to the skeleton of bisphenol AD epoxy resin with an alkyl group having 2 to 12 carbon atoms, a phenolic novolac epoxy resin, a cresol novolac epoxy resin, a triphenylmethane polyfunctional epoxy resin, an alicyclic epoxy compound, a naphthol-modified novolac epoxy resin and an epoxy compound of glycidyl o-, m- or p-phthalate or o-, m- or p-hydrophthalate.

6. A method for crosslinking an isoprene-isobutylene rubber according to claim 1, which comprises adding, to 100 parts by weight of an isoprene-isobutylene rubber, 5 to 25 parts by weight of an alkylphenol-formaldehyde resin, 0.1 to 5 parts by weight of at least one kind of hydrazide compound, and 0.3 to 10 parts by weight of at least one kind of epoxy compound.

7. A crosslinked rubber product obtained by crosslinking an isoprene-isobutylene rubber according to a crosslinking method set forth in any of claims 1 to 4, 5 and 6.

* * * * *